United States Patent [19]
Mihara

[11] Patent Number: 5,296,969
[45] Date of Patent: Mar. 22, 1994

[54] ZOOM LENS SYSTEM HAVING A SHORT TOTAL LENGTH

[75] Inventor: Shinichi Mihara, Tokyo, Japan

[73] Assignee: Olympus Optical Co., Ltd., Tokyo, Japan

[21] Appl. No.: 939,944

[22] Filed: Sep. 2, 1992

[30] Foreign Application Priority Data

Sep. 2, 1991 [JP] Japan ................... 3-221697

[51] Int. Cl.$^5$ ............... G02B 15/14; G02B 13/18; G02B 3/02
[52] U.S. Cl. ................... 359/687; 359/684; 359/715
[58] Field of Search ............ 359/774, 771, 713, 715, 359/676, 684, 686, 687

[56] References Cited

U.S. PATENT DOCUMENTS

| | | | |
|---|---|---|---|
| 4,416,518 | 11/1983 | Hugues et al. | 359/687 X |
| 4,859,042 | 8/1989 | Tanaka | 350/423 |
| 4,995,707 | 2/1991 | Hashimoto | 359/687 |
| 5,138,492 | 8/1992 | Hamano et al. | 359/684 |
| 5,155,630 | 10/1992 | Hata | 359/687 |
| 5,189,558 | 2/1993 | Ishii et al. | 359/687 |

FOREIGN PATENT DOCUMENTS 62-178917 8/1987 Japan .
00012624 1/1991 Japan ................... 359/687

Primary Examiner—Bruce Y. Arnold
Assistant Examiner—David R. Parsons
Attorney, Agent, or Firm—Cushman, Darby & Cushman

[57] ABSTRACT

The present invention provides a zoom lens system which comprises nine or less constituent lenses in all, has a short total length and a small front lens, is reduced in terms of size, weight and cost, has a high zoom ratio and a large aperture ratio, and is best suited for use with handy camcorders, and which comprises a first lens unit G1 having a positive refracting power, a second lens unit G2 having a negative refracting power and movable horizontally along the optical axis during zooming, a third lens unit G3 constantly remaining fixed and consisting of a positive lens in which the object-side surface has a stronger curvature and at least the object-side surface takes an aspherical configuration and a negative meniscus lens in which the image-side surface has a stronger curvature, two lenses in all, said third lens unit G3 having a positive refracting power as a whole, and a fourth lens unit G4 movable horizontally along the optical axis for focus regulation during zooming and moving the object point and consisting solely of a positive single lens in which the object-side surface assumes an aspherical configuration.

13 Claims, 5 Drawing Sheets

ZOOM LENS SYSTEM HAVING A SHORT TOTAL LENGTH

BACKGROUND OF THE INVENTION

The present invention relates generally to a zoom lens system having a short total length and, more specifically, to a high-performance zoom lens system which is of small size and has a high zoom ratio and a large aperture ratio and this lends itself to use in camcorders.

Recent radical reductions in the size, weight and cost of video cameras have increased the popularity of camcorders and their availability to the general public. Typically, a video camera comprises an electric circuit board, an actuator (mechanical) system and an optical system. So far, size and cost reductions have been achieved in the electrical system in particular. More recently, however, some considerable reductions in the size of the image sensor optical system have been pursued. At present, the size and cost reductions of the image sensor optical system are being achieved by the development of a new zoom type which makes effective use of new techniques for miniaturizing imagers, processing aspherical surfaces rotation-symmetrically and automatic TTL focusing. Several examples of those novel zoom lenses are set forth in JP-Kokai-62-24213, JP-Kokai-62-178917, JP-Kokai-62-215225, etc. However, the present need for size and weight reductions, especially, reductions in the total length and the diameter of front lenses are immense. For those reasons, such rear focus versions as set forth in the above-mentioned JP-Kokai-62-24213, 62-178917 and 62-215225 and some versions in which the compensator unit is located in the rear of a stop have now been adopted. These versions may possibly have astonishing latent faculties of reducing the total length and making the front lens diameter small. Referring especially to JP-Kokai-62-178917, it teaches that some considerable reduction in the number of constituent lenses is achievable by applying an aspherical surface to the above-mentioned image formation system and sufficient correction of aberrations is attainable as well. However, virtually no size reduction can be achieved because the total length and front lens diameter are not substantially different from those of conventional or classical lens configuration.

That is to say, the system disclosed in JP-Kokai-62-178917 comprises a zoom subsystem including a first unit having a positive refracting power and a second unit having a negative refracting power and an image formation subsystem including a third unit consisting solely of a positive single lens having an aspherical surface and always remaining fixed and a fourth unit having at least one negative lens or consisting generally of two or three lenses and movable during zooming and for regulating the focal position depending on how far the subject is spaced. Thus, the use of the rear focus which also serves as a compensator and the aspherical surface renders it possible to reduce the number of constituent lens to ten or below, thereby reducing extra space. This thus enables the front lens diameter to be reduced and makes it possible to reduce the total length. The rear focus configuration could make it easy to increase the power of the first unit. However, this is not the case and the power of the second unit remains weak as well. In addition, using a single lens for the third unit incurs another disadvantage. In other words, the luminous flux cannot be converged well here, so that it can not afocally exit. For this reason, nothing remains but to increase the focal length of the fourth unit, and the back focus remains long as well; that is, no sufficient reductions in the total length, front lens diameter, etc. are achieved.

SUMMARY OF THE INVENTION

In view of such situations as mentioned above, it is an object of this invention to provide a zoom lens system which comprises nine or less constituent lenses in all, has a very short total length and a small front lens diameter, is much more reduced in size, weight and cost, and has a large aperture ratio and a high zoom ratio by setting and achieving mechanically the paraxial configuration of each of the lens units constituting a zoom lens system comprising a zoom subsystem consisting of a first unit having a positive refracting power and a second unit having a negative refracting power and an image formation subsystem consisting of a third unit having a positive refracting power and always remaining fixed and a fourth unit having a positive refracting power and movable during zooming and for focal position regulation by adopting some suitable means for the lens configurations of the third and fourth units. It is another object of this invention to provide a zoom lens system in which while such a paraxial configuration is maintained, aberrations are well compensated for to ensure very satisfactory image formation characteristics.

In order to attain the objects mentioned above, the present invention provides a zoom lens system having a short total length which includes, in order from the object side, a first lens unit having a positive refracting power, a second lens unit having a negative refracting power and movable along the optical axis for zooming, a third lens unit comprising, in order from the object side, a positive lens in which the object-side surface has a stronger curvature and takes an aspherical configuration and a negative meniscus lens in which the image-side surface has a stronger curvature, said third unit having a positive refracting power as a whole, and a fourth lens unit consisting of a positive single lens in which the object-side surface takes an aspherical configuration and movable along the optical axis for zooming and focusing, said third and fourth lens units meeting the following conditions:

$$0.4 < f_{34S}/(f_W f_T)^{\frac{1}{2}} < 0.8, \quad (1)$$

$$0.28 < \beta_{4T} < 0.56, \quad (2)$$

$$0.4 < r_{31}/\{(n_{31} - 1)(f_W f_T)^{\frac{1}{2}}\} < 0.8, \quad (3)$$

$$0.25 < r_{34}/\{(n_{34} - 1)(f_W f_T)^{\frac{1}{2}}\} < 0.6, \quad (4)$$

$$0.2 < D_{III}/(f_W f_T)^{\frac{1}{2}} < 0.4, \quad (5)$$

and $$0.3 < D_{34T}/(f_W f_T)^{\frac{1}{2}} < 0.6, \quad (6)$$

where:
$f_W$ and $f_T$ are the focal lengths of the total system at the wide angle and telephoto ends, respectively,
$f_{34S}$ is the composite focal length of the third and fourth lens units when the focal length of the total system lies at $(f_W f_T)^{\frac{1}{2}}$ and the object point at infinity is focused, $\beta_{4T}$ is the magnification of the fourth lens unit when the object point at infinity is focused at the telephoto end, $r_{31}$ and $r_{34}$ are the radii of curvature of the surfaces of the third lens unit proximate to the object and image sides, respectively, $n_{31}$ and $n_{34}$ are the refractive indices of the positive and negative meniscus lenses of the third lens unit proximate to the object and image sides, respectively, $D_{III}$ is the distance on the optical axis between the apices of the surfaces of the third lens unit proximate to the object and image sides, respectively, and $D_{34T}$ is the space on the optical axis between the third and fourth lens units, when the object point at infinity is focused at the telephoto end.

It is then desired that the first and second lens units conform to the following conditions (7)–(10):

$$0.25 < |f_{II}|/(f_W f_T)^{\frac{1}{2}} < 0.5, \tag{7}$$

$$0.25 < |\beta_{IIS}| f_W/(f_W f_T)^{\frac{1}{2}} < 0.5, \tag{8}$$

$$0.3 < D_I/(f_W f_T)^{\frac{1}{2}} < 0.6, \tag{9}$$

and $$0.25 < D_{II}/(f_W f_T)^{\frac{1}{2}} < 0.5, \tag{10}$$

where:

$f_{II}$ is the focal length of the second lens unit, $\beta_{IIS}$ is the magnification of the second lens unit when the focal length of the total system lies at $(f_W f_T)^{\frac{1}{2}}$ and the object point at infinity is focused, $D_I$ is the distance on the optical axis between the vertices of the surfaces of the first lens unit proximate to the object and image side, respectively, and $D_{II}$ is the distance on the optical axis between the vertices of the surfaces of the second lens unit proximate to the object and image sides, respectively.

It is further desired that the following conditions (11)–(14) be satisfied.

$$-1.3 < SF_{31} < -0.5, \tag{11}$$

$$-1.2 < SF_{41} < -0.4, \tag{12}$$

$$0.06 < |\Delta x_3| F_{NO}^3/(f_W f_T)^{\frac{1}{2}} < 0.22, \tag{13}$$

and $$0.006 < |\Delta x_4| F_{NO}^2/(f_W f_T)^{\frac{1}{2}} < 0.025, \tag{14}$$

where:

$SF_{31}$ and $SF_{41}$ are the shape factors of the positive lens of the third lens unit and the positive lens of the fourth lens unit, respectively, $\Delta x_3$ and $\Delta x_4$ are the departures of the aspherical surfaces of the third and fourth lens units from the reference spheres, respectively. $\Delta x_3$ defines the aspherical quality of the object-side surface of the third lens unit, and $\Delta x_4$ defines the aspherical quality of the object-side surface of the fourth lens. The values of $\Delta x_3$ and $\Delta x_4$ mentioned in the respective examples are found by the conditions 13 and 14 which may be found below in the Table presenting the values of conditions (10)–(17). It is thus unnecessary to particularly mention here the relation between these values and the equation that defines the aspherical surface. Here it is noted that $\Delta x_3$ and $\Delta x_4$ have nothing to do with the aspherical equation.

$F_{NO}$ is the F-number of the total system at the wide angle end.

Additionally, it is desired that the following condition (15) be met.

$$0.07 < D_{IV}/(f_W f_T)^{\frac{1}{2}} < 0.2, \tag{15}$$

where $D_{IV}$ is the thickness of the positive lens of the fourth lens unit.

In a preferable embodiment of this invention, the first lens unit includes, in order from the object side, a negative meniscus lens convex on the object side and two positive lenses; the second lens unit includes, in order from the object side, a negative lens strongly concave on the image side and a cemented positive lens obtained by cementing a bi-concave lens to a positive lens strongly convex on the object side; and the following conditions (16)–(19) are satisfied.

$$0.7 < f_{13}/f_{12} < 1.6, \tag{16}$$

$$-0.01 < (f_W f_T)/(r_3 r_5) < 0.01, \tag{17}$$

$$1.45 < n_5 < n_6 - 0.25, \tag{18}$$

and $$1.65 < n_4, \tag{19}$$

where:

$f_{12}$ is the focal length of the positive lens of the first lens unit on the object side, $f_{13}$ is the focal length of the positive lens of the first lens unit on the image side, $r_3$ and $r_5$ are the radii of curvature of the image-side surfaces of said two positive lenses, $n_4$ is the refractive index of the negative lens located on the object side in the second lens unit, and $n_5$ and $n_6$ are the refractive indices of the respective lenses of the cemented lens of the second lens unit.

In another embodiment of this invention, the zoom lens system includes, in order from the object side, a first lens unit having a positive refracting power, a second lens unit having a negative refracting power and movable along the optical axis for zooming, a third lens unit having a positive refractive power and a fourth lens unit having a positive refracting power and movable along the optical axis for focusing, and comprises nine or less lenses in all.

It is then desired that the luminous flux leaving the third lens unit be in a substantially afocal or convergent state. Alternatively, the third lens unit may include a positive lens in which the object-side surface has a stronger curvature and a negative lens in which the image-side surface has a stronger curvature, the object-side surface of said positive lens taking an aspherical configuration whose curvature decrease monotonously as it is spaced away from the optical axis, and the forth lens unit may consist of a positive single lens, in which the object-side surface takes an aspherical configuration whose curvature decreases monotonously as it is spaced away from the optical axis.

In the ensuing description, why the above-mentioned arrangement is used and how it acts will be explained.

The present invention provides a zoom lens system having a short total length which includes, in order from the object side, a first lens unit having a positive refracting power, a second lens unit having a negative refracting power and movable along the optical axis for zooming, a third lens unit comprising, in order from the object side, a positive lens in which the object-side surface has a stronger curvature and takes an aspherical configuration and a negative meniscus lens in which the image-side surface has a stronger curvature, said third unit having a positive refracting power as a whole, and a fourth lens unit consisting solely of a positive single lens in which the object-side surface takes an aspherical configuration and movable horizontally along the optical axis during zooming and for focus regulation during the movement of an object point. The so-called rear focus system (focus by the fourth lens unit) underlies this system, which is thus very suitable for reducing the total length for the reasons set forth below.

When the rear focus system is utilized, it is preferred that the luminous flux leaving the third lens unit be made substantially afocal so as to reduce aberrational variations during focusing to a practically acceptable level. On the other hand, the shorter the focal length of the fourth lens unit, the shorter the entire back focus is, so that the total length can be reduced. Now let $\beta_A$ denote the magnification of the afocal section defined by the first-third lens units and $f_{IV}$ denote the focal length of the fourth lens unit, then the focal length of the entire system can be represented by $\beta_A f_{IV}$; this teaches that reducing $f_{IV}$ is achieved by increasing $\beta_A$. Then let $f_I$ denote the focal length of the first lens unit, $\beta_{II}$ denote the magnification of the second lens unit and $f_{III}$ denote the focal length of the third lens unit. We obtain $$\beta_A = f_I \beta_{II} / f_{III}.$$

Here, some difficulty is encountered in increasing the values of $f_I$ and $\beta_I$ considerably, if consideration is taken into the lengths of the zoom sections (the first and second lens units) and the lenses' diameters. Thus, $\beta_A$ could conceivably be increased by reducing the value of $f_{III}$. However, a reduction in the value of $f_{III}$ allows the principal point of the third lens unit to approach to the image point by said zoom sections, thus making the mechanical interference of the second with the third lens unit likely to occur. For this reason, the second lens unit is designed such that the principal point of the third lens unit is located on the side of the second lens unit. In other words, the third lens unit comprising, in order from the object (second lens unit) side, a positive lens in which the object-side surface has a stronger curvature and two negative lenses in which the image-side surfaces have a stronger curvature (the two negative lenses are used for space saving, thereby reducing the total length). Then, the occurrence of spherical aberration in particular can be suppressed by allowing the object-side surface of the positive lens exerting a strong power to take an aspherical configuration whose curvature decreases monotonously as it is spaced away from the optical axis. Similarly, the fourth lens unit consists solely of a positive single lens in which the object-side surface assumes an aspherical configuration whose curvature decreases monotonously as it is spaced away from the optical axis, because its power is strong and, in particular, its off-axial ray height is large, as already mentioned.

It is understood that the afocal nature of said afocal sections may not be so stringent. Somewhat convergent luminous flux, if lies within the permissible range of aberrational variations during focusing, is preferable, because it is possible to reduce the back focus and, hence, the total length of the lens system much more. It is thus desired that the composite focal length of the third and fourth lens units and the magnification of the fourth lens unit, rather than only the value of $f_{III}$, be defined as represented by Conditions (1) and (2).

$$0.4 < f_{34S}/(f_W f_T)^{\frac{1}{2}} < 0.8, \tag{1}$$

and $$0.28 < \beta_{4T} < 0.56. \tag{2}$$

In this connection, it is noted that falling short of the lower limit of Condition (1) is unpreferred, because the mechanical interference of the second with the third lens unit is likely to occur, and that above the upper limit any reduction in the total length is unachievable; nor is the purpose of this invention attainable. Falling short of the lower limit of Condition (2) is unfavorable for reducing the back focus, while exceeding the upper limit of Condition (2) is again unpreferred, because the capability of the fourth lens unit to achieve focus regulation drops and much space is needed for the amount of movement of the fourth lens unit. This is in constrast to size reductions and, at the same time, gives rise to an increase in aberrational variations during zooming and focusing. For the reasons stated above, Conditions (1) and (2) are laid down.

If the following conditions (3)–(5) are met, then the mechanical interference mentioned above is likely to occur.

$$0.4 < r_{31}/\{(n_{31} - 1)(f_W f_T)^{\frac{1}{2}}\} < 0.8, \tag{3}$$

$$0.25 < r_{34}/\{(n_{34} - 1)(f_W f_T)^{\frac{1}{2}}\} < 0.6, \tag{4}$$

$$0.2 < D_{III}/(f_W f_T)^{\frac{1}{2}} < 0.4, \tag{5}$$

In this connection, it is understood that below the lower limits of Conditions (3) and (4), only the principal point of the third lens unit is located so more closely to the second lens unit that even when the focal length of the third lens unit is reduced, the mechanical interference of the third with the second lens unit is unlikely to occur, but some limitation is placed on correcting spherical aberration, even through reliance is placed on an aspherical surface. Above the upper limits, on the other hand, the aforesaid mechanical interference is so likely to occur that nothing remains but to increase the focal length of the third lens unit. It is here noted that the larger the space between the converging and diverging surfaces of the third lens unit proximate to the object and image sides, the more likely it is to allow the principal point of the third lens unit to approach to the second lens unit without reducing the values of $r_{31}$ and $r_{34}$. However, when this space is too large, there is an increase in the total length of the relay section (the composite section of the third and fourth lens units), which is inappropriate for the purpose of this invention. This is defined by Condition (5).

In order to reduce the total length of the relay section, it is preferable to reduce the air spacing between the third and fourth lens units as much as possible. This air spacing is used as the space within which the fourth lens unit moves for focus regulation in association with zooming or the movement of the object point. In order to reduce this as much as possible, it is ideal that the powers of the respective units are such arranged as to reduce the amount of movement of the fourth lens unit. Indeed, however, there is a slight increase in the amount of movement, because the magnification of the second lens unit of the zoom section to be described later should be somewhat increased. Laid down for this reason is Condition (6):

$$0.3 < D_{34T}/(f_W f_T)^{1/2} < 0.6. \quad (6)$$

Above the upper limit of Condition (6) the total length is likely to increase, whereas below the lower limit it is required to increase the power of the second lens unit.

Referring then to reducing the zoom section defined by the first and second lens units, this is also effective for reducing the diameter of the first lens unit. The total length of the zoom section is determined by the total thickness of the first lens unit, the total thickness of the second lens unit and the space allowed for moving the second lens unit. First, it is conceived to reduce the moving space of the second lens unit. This is conceivably achieved by: (i) reducing the focal length of the second lens unit and (ii) increasing the magnification of the second lens unit. In terms of effect, (ii) is superior to (i). In order to achieve (ii), however, it is required to enhance the power of the first lens unit; redoubling the second lens unit results in a reduction-by-half in the third lens unit, thus offsetting the redoubling effect; the orbit of the fourth lens unit is so sharp at the telephoto end that much space is needed for moving the fourth lens unit, focusing or other purposes; and so on. For those reasons, the magnification of the second lens unit cannot be very increased. Thus, both should be well-balanced. Desirable to this end is to meet Conditions (7) and (8).

$$0.25 < |f_{II}|/(f_W f_T)^{1/2} < 0.5, \quad (7)$$

and $$0.25 < |\beta_{IIS}| f_W/(f_W f_T)^{1/2} < 0.5. \quad (8)$$

Then, the total thicknesses of the first and second lens units are considered. As a matter of course, these should preferably be as this as possible. This can not only reduce the total length but can also shallow the position of the entrance pupil in combination with the reduction in the moving space of the second lens unit, contributing to reducing the front lens diameter. This reduction in the front lens diameter makes it possible to enhance the power of the first lens unit or thin the forst lens unit. Desirable for this is to meet the conditions (9) and (10):

$$0.3 < D_I/(f_W f_T)^{1/2} < 0.6, \quad (9)$$

and $$0.25 < D_{II}/(f_W f_T)^{1/2} < 0.5. \quad (10)$$

Below the lower limit of Condition (7) aberrational variations are likely to increase by zooming, whereas exceeding the upper limit is unpreferred, because the amount of movement of the second lens unit is likely to increase or much space is needed for moving the fourth lens unit. Below the lower limit of Condition (8) the zooming effect is less relative to the amount of movement, whereas above the upper limit much space is needed for moving the fourth lens unit, or the power of the first lens unit becomes too strong to make the deterioration of aberrations at the telephoto end likely to occur. Below the lower limits of Conditions (9) and (10), some difficulty is involved in ensuring the edge thicknesses of the positive lenses, or their powers become weak enough to increase the total length, whereas above the upper limits not only is the total length of the zoom section likely to increase, but the first lens unit increases in diameter as well.

It is thus possible to reduce the total length of the zoom lens system largely—the object of this invention, while correcting aberrations at high levels. It is here noted that much better correction of aberrations than mentioned just above is achieved by conforming to the following conditions (11)–(14):

$$-1.3 < SF_{31} < -0.5, \quad (11)$$

$$-1.2 < SF_{41} < -0.4, \quad (12)$$

$$0.06 < |\Delta x_3| F_{NO}^3/(f_W f_T)^{1/2} < 0.22, \quad (13)$$

and $$0.006 < |\Delta x_4| F_{NO}^2/(f_W f_T)^{1/2} < 0.025, \quad (14)$$

Conditions (11) and (12) define the shape factors $SF_{31}$ and $SF_{41}$ of the positive lenses of the third and fourth lens units, respectively. By definition, the shape factor of a positive lens is represented by $$(r_F + r_R)/(r_F - r_R)$$

where:
$r_F$ is the paraxial radius of curvature of the surface of the positive lens on the object side, and
$r_R$ is the paraxial radius of curvature of the surface of the positive lens on the image side. Above the upper limit of Condition (11) it is difficult to satisfy the above-mentioned condition (3), whereas below the lower limit some limitation is imposed on correcting spherical and coma aberrations. Above the upper limit of Condition (12) some limitation is imposed on correcting the high-order aberrations of the luminous flux leaving the negative lens of the third lens unit, whereas below the upper limit barrel form distortion tends to occur.

Conditions (13) and (14) define the amounts, $\Delta x_3$ and $\Delta x_4$, of displacement of the ashperical surfaces of the third and fourth lens units from the reference spherical surface. Here, $F_{NO}$ is the open F-number at the wide angle end. The surface of the third lens unit proximate to the object side contributes to correcting spherical aberration. This surface may be easily located adjacent to a stop, and may make it possible to correct spherical aberration in a certain state object point, even below the lower limits of Conditions (3) and (4). However, its influence on other aberrations, e.g., coma aberration is not negligible. The aspherical surface of the fourth lens unit on the object side has a large influence on aberrations other than spherical one, and is so useful for correcting coma aberration in particular that the spherical aberration affected there can be compensated for the aspherical surface of the third lens unit. However, it is impossible to increase the amount of displacement to the level achieved by the third lens unit. When the both the upper limits of Conditions (13) and (14) are exceeded, some adverse effects are likely to be produced on aberrations other than the one to be corrected, whereas when the lower limits are not reached, no sufficient correction takes place.

Besides, it is preferable to additionally adopt Condition (15) in relation to the fourth lens unit.

$$0.07 < D_{IV}/(f_W f_T)^{\frac{1}{2}} < 0.2. \tag{15}$$

Here $D_{IV}$ stands for the distance between the vertices of the surfaces of the fourth lens unit proximate to the object and image sides. As is the case with Conditions (5) and (6), when the upper limit is exceeded, there is an increase in the total length, whereas when the lower limit is not reached, not only is it required to diminish the power of the positive lens so as to assure its edge thickness, but the upper limit of Condition (2) is likely to be exceeded.

Finally, the zoom section taking part in aberrational variations during zooming will be defined at great length. On condition that the first lens unit includes, in order from the object side, a negative meniscus lens convex on the object side and two positive lenses, three in all, and the second lens unit includes, in order from the object side, a negative lens strongly concave on the image side and a cemented lens obtained by cementing a bi-concave lens to a positive lens strongly convex on the object side, three in all, the following conditions (16)–(19) should preferably be satisfied.

$$0.7 < f_{13}/f_{12} < 1.6, \tag{16}$$

$$-0.01 < (f_W f_T)/(r_3 r_5) < 0.01, \tag{17}$$

$$1.45 < n_5 < n_6 - 0.25, \tag{18}$$

and $$1.65 < n_4. \tag{19}$$

Condition (16) defines the ratio between the focal length, $f_{12}$, of the positive lens of the first lens unit on the object side and the focal length, $f_{13}$, of the positive lens on the image side. If the upper limit is exceeded, then some limitation is imposed on reducing the front lens diameter, whereas if the lower limit is not reached, then some limitation is placed on the level of correcting barrel form distortion at the wide angle end and spherical and coma aberrations at the telephoto end.

Condition (17) defines the product of the radii of curvature, $r_3$ and $r_5$, of the image-side surfaces of said two positive lenses of the first lens unit, respectively. Reducing the diameter of the first lens unit is as important as reducing the total length and, as already mentioned, this is most effectively achieved by reducing the entire length of the zoom section. However, this may also be achieved to some extent by reducing the depth of the entrance pupil, although depending upon lens configuration. For this, Condition (16) is as relatively useful as Condition (17). When the upper limit is exceeded, some limitation is imposed on reducing the front lens diameter by locating the entrance pupil closely to the first lens unit. When the lower limit is not reached, on the other hand, the meridional image surface is likely to be tilted down on the negative side at the expense of the effect of the aspherical surface effect of the fourth lens unit.

Condition (18) defines the difference between the refractive indices, $n_5$ and $n_6$, of the cemented lens of the second lens unit. When the total length is reduced and the zoom ratio is increased, aberrational variations (esp., spherical aberration, coma and astigmatism) during zooming are quite likely to increase. In order to correct the aberrations well while reducing the total length of a high-zoom-ratio zoom lens as much as possible, it is required to increase the difference in the refractive indices of the cemented lens of the second lens unit to a certain or higher level; that is, there is some limit. When the right sign of inequality of Condition (18) is reversed or the upper limit thereof is exceeded, it is difficult to correct aberrational variations during zooming.

Condition (19) defines the refractive index, $n_4$, of the single negative lens of the second lens unit on the object side. The lower limit of Condition (18) being not reached is unpreferred. This is because unless the value of $n_4$ is increased to a certain or higher level—because it is required to decrease the value of $n_5$ of the negative lens, then the power of the second lens unit is diminished or the Petzval's sum takes a negative value. In this regard, it is appreciated that the zoom lens system according to this invention has an additional merit of maintaining the Petzval's sum at a suitable positive value because of the short focal length of the third and fourth units (relay subsystem), even when the power of the second lens unit is increased to reduce the total length extremely.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
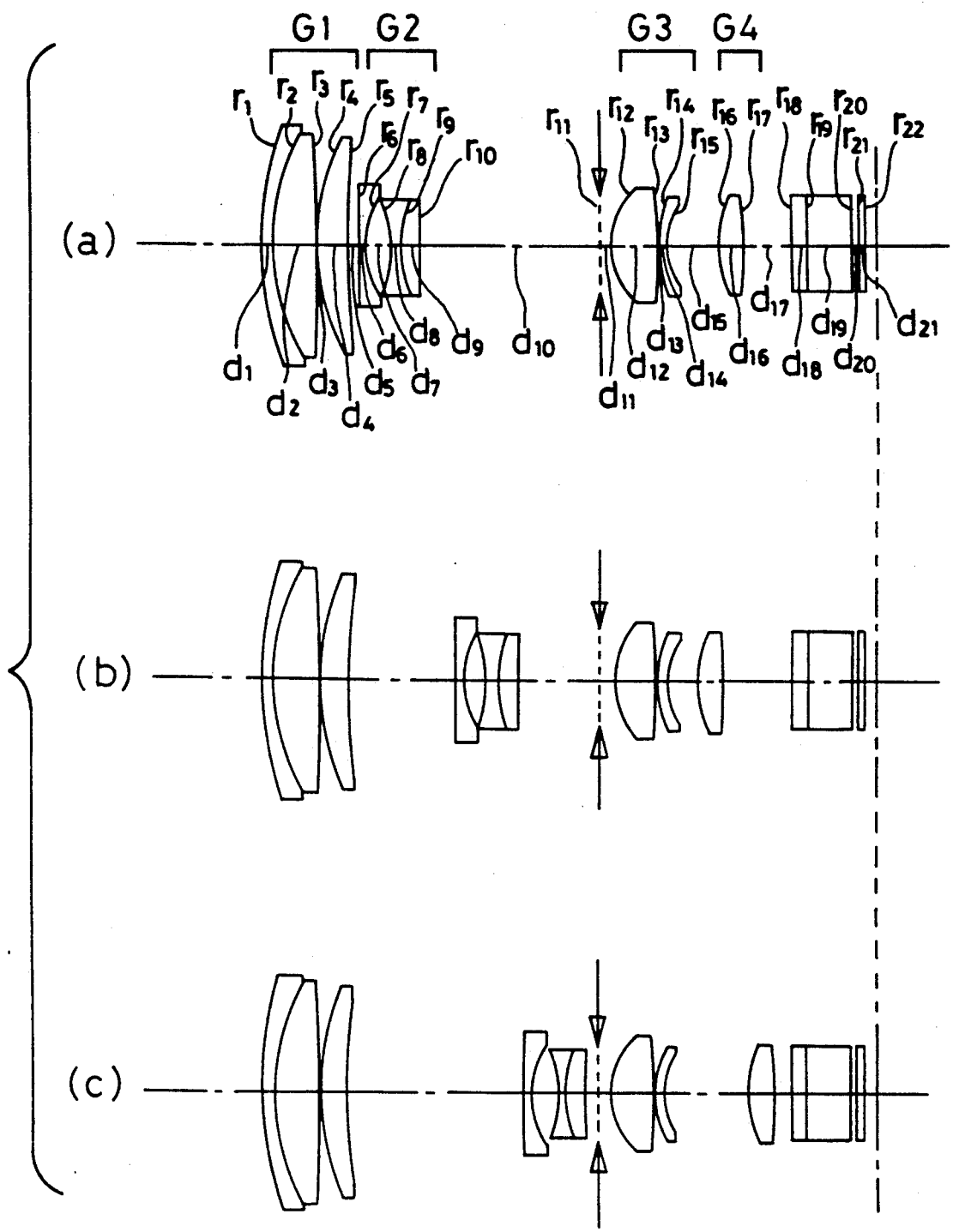
FIGS. 1(a), (b), and (c) represent in section the lens arrangements of Example 1 at the (a) wide angle end, (b) standard and (c) telephoto end settings, FIGS. 2(a), (b) and (c) are aberration diagrams showing spherical aberrations, astigmatisms, distortions, chromatic aberrations of magnification and comas (meridional) of Example 1 at the (a) wide angle end, (b) standard and (c) telephoto end settings, FIGS. 3(a), (b) and (c) are aberration diagrams of Example 2, similar to those of FIG. 2, FIGS. 4(a), (b) and (c) are aberration diagrams of Example 3, similar to those of FIG. 2, and FIGS. 5(a), (b) and (c) are aberration diagrams of Example 4, similar to those of FIG. 2.

In the following description, reference will be made to Examples 1–4 of the zoom lens system according to this invention, the lens data of which will be enumerated later. The sections of the lens arrangement of Example 1 at the (a) wide angle end, (b) standard and (c) telephoto end settings. It is noted that the lens sections and moving orbits of Examples 2–4 are not shown because of being similar to those of Example 1.

In each of Examples 1–4, the first lens unit G1 includes, in order from the object side, a cemented lens obtained by cementing a negative meniscus lens convex on the object side to a positive meniscus lens and a positive meniscus lens convex on the object side, three lenses in all; the second lens unit G2 includes, in order from the object side, a negative meniscus lens convex on the object side and a cemented lens obtained by cementing a bi-concave lens to a positive meniscus lens convex on the object side, three lenses in all; the third lens unit G3 consists of, a bi-convex positive lens in which the object-side surface has a stronger curvature and a negative meniscus lens convex on the object side, two lenses in all; and the fourth lens unit G4 consists solely of a bi-convex positive lens. Turning to aspherical configurations, two aspherical surfaces are applied to the surface of the third lens unit G3 proximate to the object side and the surface of the fourth lens unit G4 proximate to the object side in each of Examples 1–3; and an additional aspherical surface is added to the second surface of the third lens unit G3. In each example, the 18th–22nd surfaces stand for optical members such as filters.

In what follows, the symbols used hereinafter but not mentioned hereinbefore means:
f: the focal length of the total system
$F_{NO}$: the F-number
$\omega$: the half field angle
$r_1, r_2, \ldots$: the radii of curvature of the respective lens surfaces
$d_1, d_2, \ldots$: the spacings between the respective lens surfaces
$n_{d1}, n_{d2}, \ldots$: the d-line refractive indices of the respective lenses
$\nu_{d1}, \nu_{d2}, \ldots$: the Abbe's numbers of the respective lenses It is understood that let x denote the optical axis direction and y denote the direction orthogonal to the optical axis, then the aspherical configuration is represented by $$x = (y^2/r)/[1 + \{1 - P(y^2/r^2)\}^{\frac{1}{2}}] + A_4 Y^4 + A_6 y^6 + A_8 y^8 + A_{10} y^{10}$$

where r is the paraxial radius of curvature, P the conical coefficient and $A_4, A_6, A_8$ and $A_{10}$ the aspherical surface coefficients.

EXAMPLE 1

| $f = 6.700 \sim 18.383 \sim 50.440$ | | | |
|---|---|---|---|
| $F_{NO} = 1.85 \sim 2.01 \sim 2.37$ | | | |
| $\omega = 25.2 \sim 9.7 \sim 3.6°$ | | | |
| $r_1 = 30.2665$ | $d_1 = 1.0000$ | $n_{d1} = 1.84666$ | $\nu_{d1} = 23.78$ |
| $r_2 = 19.5937$ | $d_2 = 4.5000$ | $n_{d2} = 1.56873$ | $\nu_{d2} = 63.16$ |
| $r_3 = 317.1048$ | $d_3 = 0.1500$ | | |
| $r_4 = 23.8224$ | $d_4 = 3.1000$ | $n_{d3} = 1.60311$ | $\nu_{d3} = 60.70$ |
| $r_5 = 121.3385$ | $d_5 =$ (Variable) | | |
| $r_6 = 120.1756$ | $d_6 = 0.7000$ | $n_{d4} = 1.77250$ | $\nu_{d4} = 49.66$ |
| $r_7 = 7.4564$ | $d_7 = 2.8500$ | | |
| $r_8 = -10.1802$ | $d_8 = 0.7000$ | $n_{d5} = 1.48749$ | $\nu_{d5} = 70.20$ |
| $r_9 = 11.6269$ | $d_9 = 2.0500$ | $n_{d6} = 1.84666$ | $\nu_{d6} = 23.78$ |
| $r_{10} = 88.1637$ | $d_{10} =$ (Variable) | | |
| $r_{11} = \infty$ (Stop) | $d_{11} = 1.4000$ | | |
| $r_{12} = 6.6636$ (Aspheric) | $d_{12} = 3.8641$ | $n_{d7} = 1.67790$ | $\nu_{d7} = 55.33$ |
| $r_{13} = -67.8638$ | $d_{13} = 0.1500$ | | |
| $r_{14} = 17.4669$ | $d_{14} = 0.7000$ | $n_{d8} = 1.84666$ | $\nu_{d8} = 23.78$ |
| $r_{15} = 5.9830$ | $d_{15} =$ (Variable) | | |
| $r_{16} = 11.1477$ (Aspheric) | $d_{16} = 2.3500$ | $n_{d9} = 1.58913$ | $\nu_{d9} = 61.18$ |
| $r_{17} = -35.3228$ | $d_{17} =$ (Variable) | | |
| $r_{18} = \infty$ | $d_{18} = 1.6000$ | $n_{d10} = 1.51633$ | $\nu_{d10} = 64.15$ |
| $r_{19} = \infty$ | $d_{19} = 4.4000$ | $n_{d11} = 1.54771$ | $\nu_{d11} = 62.83$ |
| $r_{20} = \infty$ | $d_{20} = 0.5000$ | | |
| $r_{21} = \infty$ | $d_{21} = 0.6000$ | $n_{d12} = 1.48749$ | $\nu_{d12} = 70.20$ |
| $r_{22} = \infty$ | | | |

| Zooming Spaces | | | |
|---|---|---|---|
| f | 6.700 | 18.383 | 50.440 |
| $d_5$ | 0.900 | 10.436 | 17.346 |
| $d_{10}$ | 17.746 | 8.210 | 1.300 |
| $d_{15}$ | 4.933 | 3.100 | 8.410 |
| $d_{17}$ | 4.977 | 6.810 | 1.500 |

| Aspherical Coefficients |
|---|
| 12th surface |
| P = 0.8893 |
| $A_4 = -0.26729 \times 10^{-3}$ |
| $A_6 = -0.66210 \times 10^{-5}$ |
| $A_8 = 0.12935 \times 10^{-6}$ |
| $A_{10} = -0.44519 \times 10^{-8}$ |
| 16th surface |
| P = 0.9177 |
| $A_4 = -0.14136 \times 10^{-3}$ |
| $A_6 = 0.13485 \times 10^{-6}$ |
| $A_8 = -0.36494 \times 10^{-6}$ |
| $A_{10} = 0.14651 \times 10^{-7}$ |

EXAMPLE 2

| $f = 6.700 \sim 18.383 \sim 50.440$ | | | |
|---|---|---|---|
| $F_{NO} = 1.85 \sim 2.04 \sim 2.52$ | | | |
| $\omega = 25.2 \sim 9.7 \sim 3.6°$ | | | |
| $r_1 = 31.4900$ | $d_1 = 1.0000$ | $n_{d1} = 1.84666$ | $\nu_{d1} = 23.78$ |
| $r_2 = 19.7362$ | $d_2 = 4.4000$ | $n_{d2} = 1.56873$ | $\nu_{d2} = 63.16$ |
| $r_3 = 4430.2180$ | $d_3 = 0.1500$ | | |
| $r_4 = 22.7257$ | $d_4 = 3.0000$ | $n_{d3} = 1.60311$ | $\nu_{d3} = 60.70$ |
| $r_5 = 116.7742$ | $d_5 =$ (Variable) | | |
| $r_6 = 115.6858$ | $d_6 = 0.7000$ | $n_{d4} = 1.77250$ | $\nu_{d4} = 49.66$ |
| $r_7 = 7.0383$ | $d_7 = 2.7500$ | | |
| $r_8 = -9.5163$ | $d_8 = 0.7000$ | $n_{d5} = 1.48749$ | $\nu_{d5} = 70.20$ |
| $r_9 = 10.6247$ | $d_9 = 1.9500$ | $n_{d6} = 1.84666$ | $\nu_{d6} = 23.78$ |
| $r_{10} = 68.0601$ | $d_{10} =$ (Variable) | | |
| $r_{11} = \infty$ (Stop) | $d_{11} = 1.3000$ | | |
| $r_{12} = 6.4442$ (Aspheric) | $d_{12} = 5.0467$ | $n_{d7} = 1.58913$ | $\nu_{d7} = 61.18$ |
| $r_{13} = -33.9443$ | $d_{13} = 0.1500$ | | |
| $r_{14} = 13.6111$ | $d_{14} = 0.7000$ | $n_{d8} = 1.84666$ | $\nu_{d8} = 23.78$ |
| $r_{15} = 5.6389$ | $d_{15} =$ (Variable) | | |
| $r_{16} = 9.1983$ (Aspheric) | $d_{16} = 2.6000$ | $n_{d9} = 1.58913$ | $\nu_{d9} = 61.18$ |
| $r_{17} = -109.4641$ | $d_{17} =$ (Variable) | | |
| $r_{18} = \infty$ | $d_{18} = 1.6000$ | $n_{d10} = 1.51633$ | $\nu_{d10} = 64.15$ |
| $r_{19} = \infty$ | $d_{19} = 4.4000$ | $n_{d11} = 1.54771$ | $\nu_{d11} = 62.83$ |
| $r_{20} = \infty$ | $d_{20} = 0.5000$ | | |
| $r_{21} = \infty$ | $d_{21} = 0.6000$ | $n_{d12} = 1.48749$ | $\nu_{d12} = 70.20$ |
| $r_{22} = \infty$ | | | |

| Zooming Spaces | | | |
|---|---|---|---|
| f | 6.700 | 18.383 | 50.440 |
| $d_5$ | 0.900 | 9.913 | 16.437 |
| $d_{10}$ | 16.837 | 7.824 | 1.300 |
| $d_{15}$ | 5.499 | 3.288 | 8.378 |
| $d_{17}$ | 4.379 | 6.590 | 1.500 |

| Aspherical Coefficients |
|---|
| 12th surface |
| P = 0.8054 |
| $A_4 = -0.32421 \times 10^{-3}$ |
| $A_6 = -0.42221 \times 10^{-5}$ |
| $A_8 = -0.33795 \times 10^{-6}$ |
| $A_{10} = -0.21200 \times 10^{-8}$ |
| 16th surface |
| P = 0.9824 |
| $A_4 = -0.12306 \times 10^{-3}$ |
| $A_6 = -0.25845 \times 10^{-5}$ |
| $A_8 = -0.75632 \times 10^{-7}$ |
| $A_{10} = 0.52398 \times 10^{-8}$ |

EXAMPLE 3

$f = 6.700 \sim 18.383 \sim 50.440$
$F_{NO} = 1.85 \sim 2.02 \sim 2.45$
$\omega = 25.2 \sim 9.7 \sim 3.6°$

| | | | |
|---|---|---|---|
| $r_1 = 32.2978$ | $d_1 = 1.0000$ | $n_{d1} = 1.84666$ | $\nu_{d1} = 23.78$ |
| $r_2 = 20.3810$ | $d_2 = 4.3000$ | $n_{d2} = 1.56873$ | $\nu_{d2} = 63.16$ |
| $r_3 = 803.6060$ | $d_3 = 0.1500$ | | |
| $r_4 = 23.6306$ | $d_4 = 3.0000$ | $n_{d3} = 1.60311$ | $\nu_{d3} = 60.70$ |
| $r_5 = 123.4602$ | $d_5 = $ (Variable) | | |
| $r_6 = 122.5055$ | $d_6 = 0.7000$ | $n_{d4} = 1.77250$ | $\nu_{d4} = 49.66$ |
| $r_7 = 7.4413$ | $d_7 = 2.8000$ | | |
| $r_8 = -9.9914$ | $d_8 = 0.7000$ | $n_{d5} = 1.48749$ | $\nu_{d5} = 70.20$ |
| $r_9 = 11.3732$ | $d_9 = 1.9500$ | $n_{d6} = 1.84666$ | $\nu_{d6} = 23.78$ |
| $r_{10} = 81.6603$ | $d_{10} = $ (Variable) | | |
| $r_{11} = \infty$ (Stop) | $d_{11} = 1.3000$ | | |
| $r_{12} = 6.3227$ (Aspheric) | $d_{12} = 4.3050$ | $n_{d7} = 1.58913$ | $\nu_{d7} = 61.18$ |
| $r_{13} = -46.2743$ | $d_{13} = 0.1500$ | | |
| $r_{14} = 12.9763$ | $d_{14} = 0.7000$ | $n_{d8} = 1.84666$ | $\nu_{d8} = 23.78$ |
| $r_{15} = 5.6762$ | $d_{15} = $ (Variable) | | |
| $r_{16} = 10.1815$ (Aspheric) | $d_{16} = 2.4000$ | $n_{d9} = 1.58913$ | $\nu_{d9} = 61.18$ |
| $r_{17} = -65.9537$ | $d_{17} = $ (Variable) | | |
| $r_{18} = \infty$ | $d_{18} = 1.6000$ | $n_{d10} = 1.51633$ | $\nu_{d10} = 64.15$ |
| $r_{19} = \infty$ | $d_{19} = 4.4000$ | $n_{d11} = 1.54771$ | $\nu_{d11} = 62.83$ |
| $r_{20} = \infty$ | $d_{20} = 0.5000$ | | |
| $r_{21} = \infty$ | $d_{21} = 0.6000$ | $n_{d12} = 1.48749$ | $\nu_{d12} = 70.20$ |
| $r_{22} = \infty$ | | | |

Zooming Spaces

| f | 6.700 | 18.383 | 50.440 |
|---|---|---|---|
| $d_5$ | 0.900 | 10.456 | 17.368 |
| $d_{10}$ | 17.768 | 8.212 | 1.300 |
| $d_{15}$ | 5.271 | 3.230 | 8.438 |
| $d_{17}$ | 4.668 | 6.708 | 1.500 |

Aspherical Coefficients

12th surface
$P = 0.7816$
$A_4 = -0.29162 \times 10^{-3}$
$A_6 = -0.57161 \times 10^{-5}$
$A_8 = 0.86256 \times 10^{-7}$
$A_{10} = -0.37600 \times 10^{-8}$

16th surface
$P = 0.9794$
$A_4 = -0.12176 \times 10^{-3}$
$A_6 = -0.16451 \times 10^{-5}$
$A_8 = -0.17066 \times 10^{-6}$
$A_{10} = 0.89866 \times 10^{-8}$

EXAMPLE 4

$f = 6.180 \sim 16.963 \sim 46.559$
$F_{NO} = 1.85 \sim 2.00 \sim 2.05$
$\omega = 27.0 \sim 10.5 \sim 3.9°$

| | | | |
|---|---|---|---|
| $r_1 = 29.9320$ | $d_1 = 0.9000$ | $n_{d1} = 1.84666$ | $\nu_{d1} = 23.78$ |
| $r_2 = 19.6563$ | $d_2 = 5.3000$ | $n_{d2} = 1.56873$ | $\nu_{d2} = 63.16$ |
| $r_3 = 635.8758$ | $d_3 = 0.1500$ | | |
| $r_4 = 24.3164$ | $d_4 = 3.1000$ | $n_{d3} = 1.60311$ | $\nu_{d3} = 60.70$ |
| $r_5 = 104.0707$ | $d_5 = $ (Variable) | | |
| $r_6 = 103.3221$ | $d_6 = 0.7000$ | $n_{d4} = 1.77250$ | $\nu_{d4} = 49.66$ |
| $r_7 = 7.2598$ | $d_7 = 3.3000$ | | |
| $r_8 = -10.2495$ | $d_8 = 0.7000$ | $n_{d5} = 1.48749$ | $\nu_{d5} = 70.20$ |
| $r_9 = 10.7539$ | $d_9 = 2.0500$ | $n_{d6} = 1.84666$ | $\nu_{d6} = 23.78$ |
| $r_{10} = 61.4257$ | $d_{10} = $ (Variable) | | |
| $r_{11} = \infty$ (Stop) | $d_{11} = 1.4000$ | | |
| $r_{12} = 6.5887$ (Aspheric) | $d_{12} = 4.0950$ | $n_{d7} = 1.67790$ | $\nu_{d7} = 55.33$ |
| $r_{13} = -40.0436$ (Aspheric) | $d_{13} = 0.1500$ | | |
| $r_{14} = 18.0443$ | $d_{14} = 0.7000$ | $n_{d8} = 1.84666$ | $\nu_{d8} = 23.78$ |
| $r_{15} = 5.7498$ | $d_{15} = $ (Variable) | | |
| $r_{16} = 9.7581$ (Aspheric) | $d_{16} = 2.4500$ | $n_{d9} = 1.58913$ | $\nu_{d9} = 61.18$ |
| $r_{17} = -42.3847$ | $d_{17} = $ (Variable) | | |
| $r_{18} = \infty$ | $d_{18} = 1.6000$ | $n_{d10} = 1.51633$ | $\nu_{d10} = 64.15$ |
| $r_{19} = \infty$ | $d_{19} = 4.4000$ | $n_{d11} = 1.54771$ | $\nu_{d11} = 62.83$ |
| $r_{20} = \infty$ | $d_{20} = 0.5000$ | | |
| $r_{21} = \infty$ | $d_{21} = 0.6000$ | $n_{d12} = 1.48749$ | $\nu_{d12} = 70.20$ |
| $r_{22} = \infty$ | | | |

Zooming Spaces

| f | 6.180 | 16.963 | 46.559 |
|---|---|---|---|
| $d_5$ | 0.900 | 10.366 | 17.114 |
| $d_{10}$ | 17.514 | 8.048 | 1.300 |
| $d_{15}$ | 4.894 | 3.100 | 7.164 |
| $d_{17}$ | 3.770 | 5.564 | 1.500 |

Aspherical Coefficients

12th surface
$P = 0.8364$
$A_4 = -0.25362 \times 10^{-3}$
$A_6 = -0.79950 \times 10^{-5}$
$A_8 = -0.17761 \times 10^{-7}$
$A_{10} = -0.52061 \times 10^{-8}$

13th surface
$P = -41.7430$
$A_4 = 0.24136 \times 10^{-5}$
$A_6 = -0.10381 \times 10^{-4}$
$A_8 = 0.11206 \times 10^{-6}$
$A_{10} = 0.28840 \times 10^{-8}$

Figure 2:
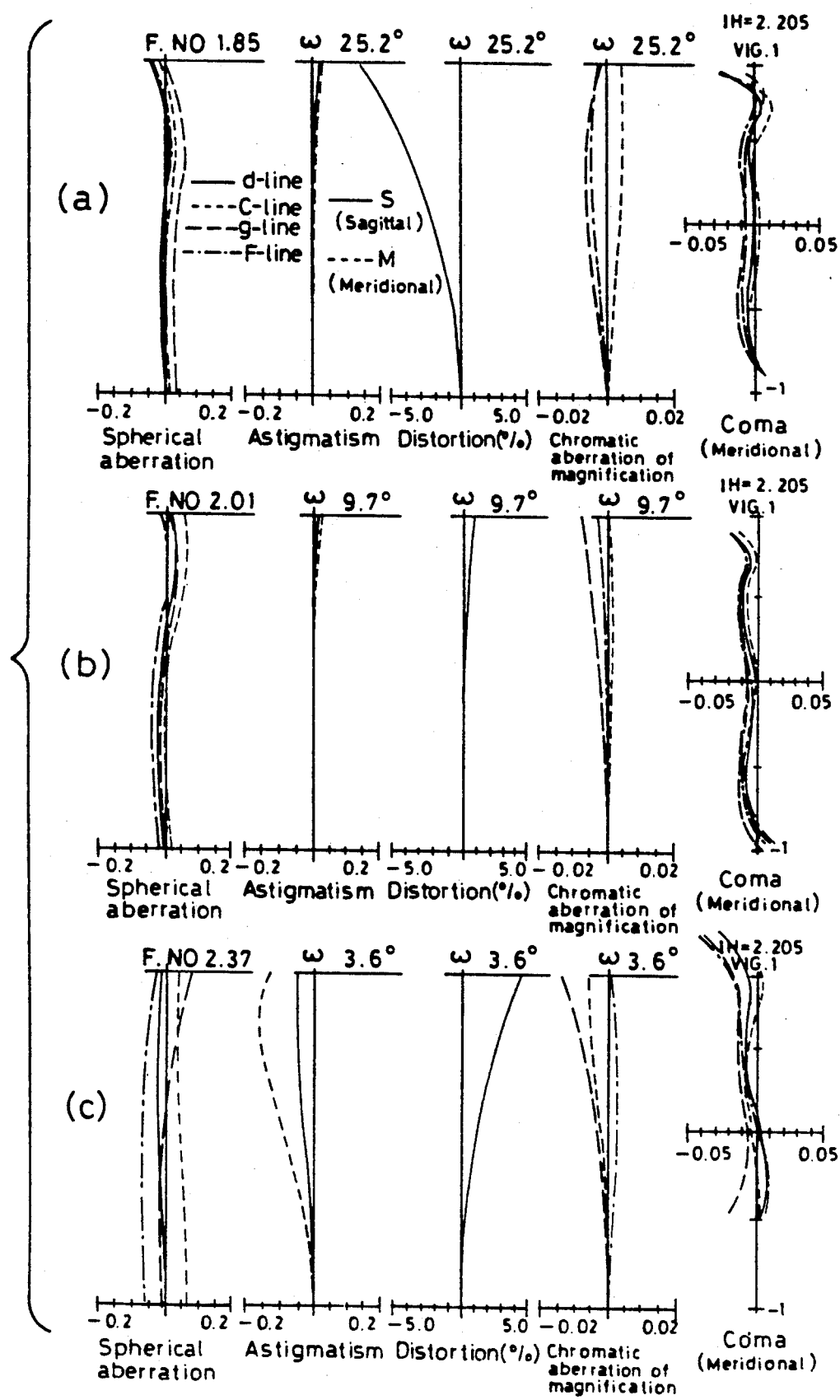
Figure 3:
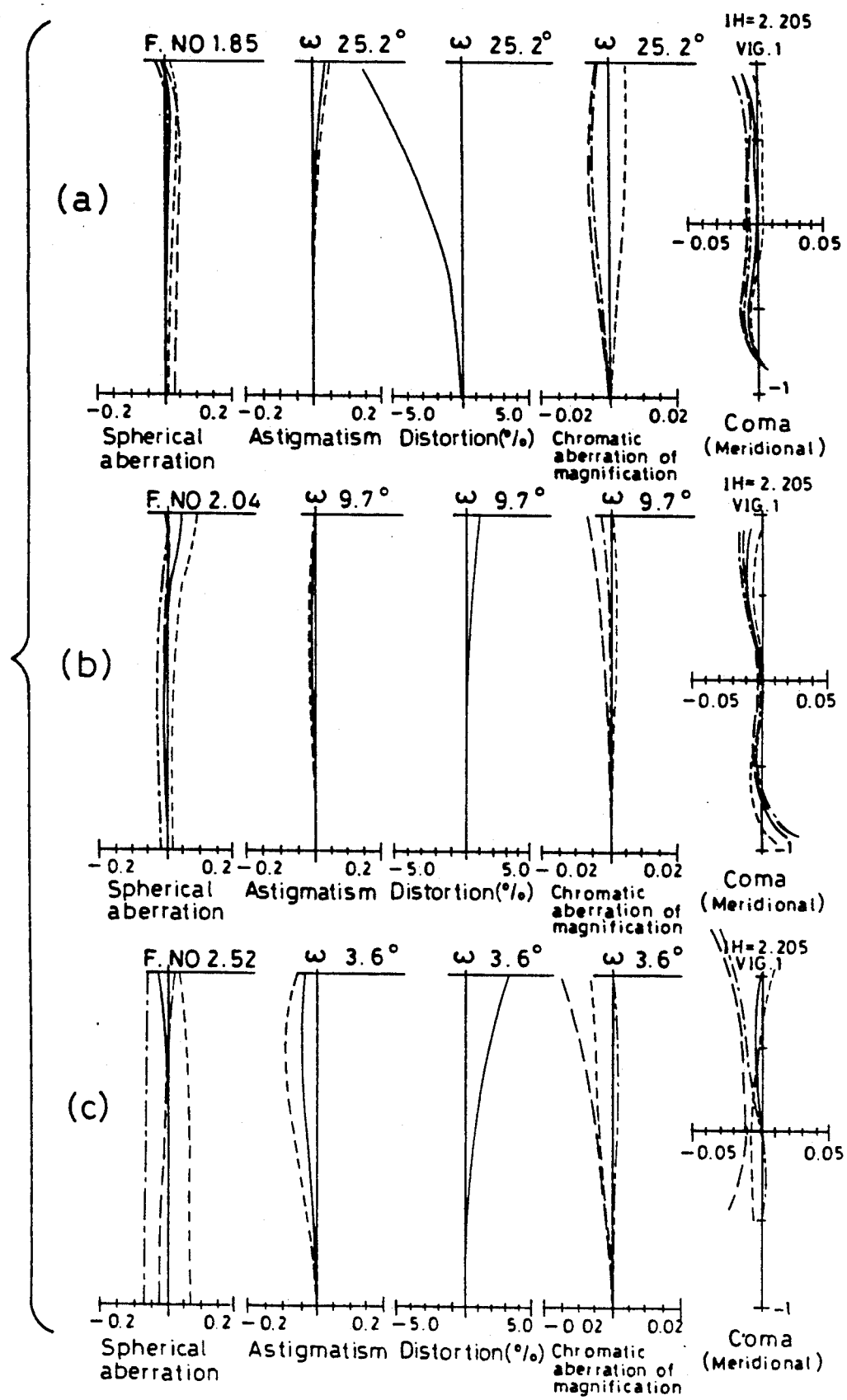
Figure 4:
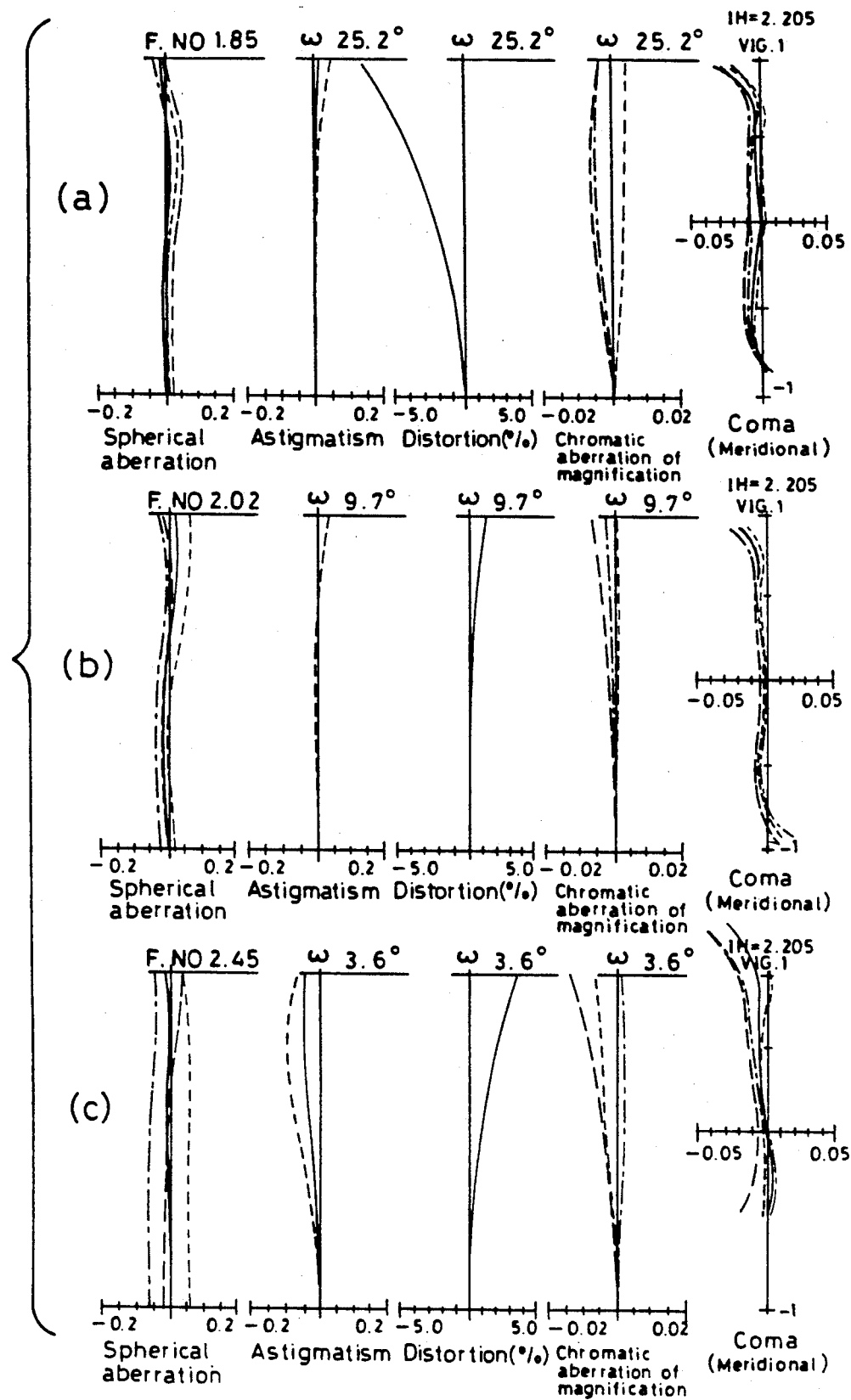
Figure 5:
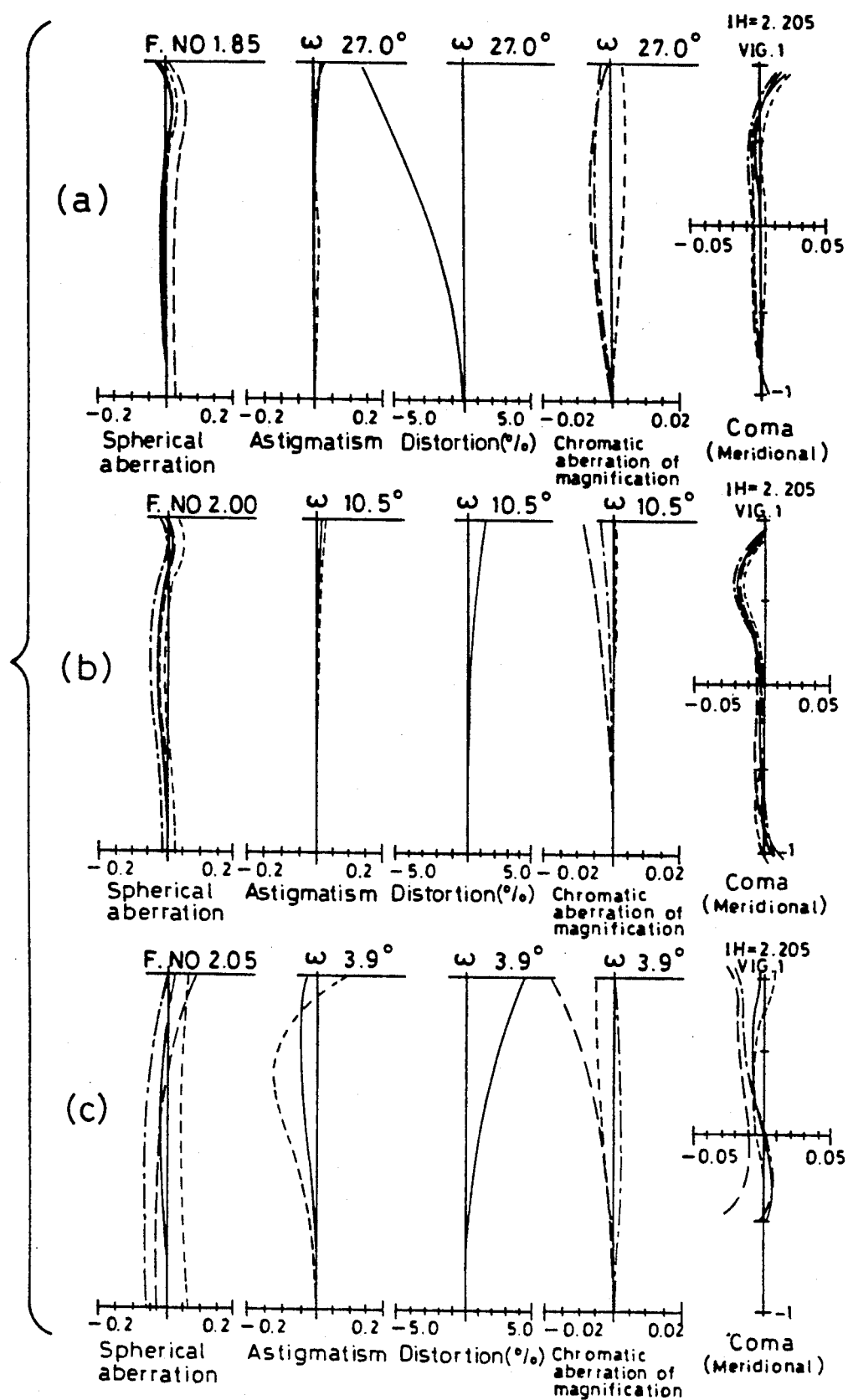

16th surface
$P = 0.7668$
$A_4 = -0.14710 \times 10^{-3}$
$A_6 = 0.58796 \times 10^{-5}$
$A_8 = -0.11041 \times 10^{-5}$
$A_{10} = 0.36142 \times 10^{-7}$ The spherical aberrations, astigmatisms, distortions, chromatic aberrations of magnification and comae of Examples 1–4 at the (a) wide angle end, (b) standard and (c) telephoto end settings are shown in the aberration diagrams of FIGS. 2–5, respectively.

The values of Conditions (10)–(17) and $n_5$, $n_6$ and $n_4$ referred to throughout the disclosure are enumerated below.

| Conditions | Example 1 | Example 2 | Example 3 | Example 4 |
|---|---|---|---|---|
| 1 | 0.6505 | 0.6553 | 0.6550 | 0.6756 |
| 2 | 0.412 | 0.381 | 0.419 | 0.362 |
| 3 | 0.5347 | 0.5950 | 0.5838 | 0.5730 |
| 4 | 0.3844 | 0.3623 | 0.3647 | 0.4004 |
| 5 | 0.2564 | 0.3208 | 0.2804 | 0.2915 |
| 6 | 0.4575 | 0.4557 | 0.4590 | 0.4223 |
| 7 | 0.4170 | 0.3860 | 0.4122 | 0.4340 |
| 8 | 0.3360 | 0.2935 | 0.3255 | 0.3188 |
| 9 | 0.4760 | 0.4651 | 0.4597 | 0.5571 |
| 10 | 0.3427 | 0.3318 | 0.3345 | 0.3979 |
| 11 | −0.8212 | −0.6809 | −0.7596 | −0.7174 |
| 12 | −0.5202 | −0.8450 | −0.7325 | −0.6257 |
| 13 | $0.9189 \times 10^{-1}$ | 0.1357 | 0.1324 | $0.9015 \times 10^{-1}$ |
| 14 | $0.1048 \times 10^{-1}$ | $0.9693 \times 10^{-2}$ | $0.9152 \times 10^{-2}$ | $0.1421 \times 10^{-1}$ |
| 15 | 0.1278 | 0.1414 | 0.1306 | 0.1444 |
| 16 | 1.3299 | 1.3268 | 1.3057 | 1.4585 |
| 17 | $0.8783 \times 10^{-2}$ | $0.6532 \times 10^{-3}$ | $0.3406 \times 10^{-2}$ | $0.4348 \times 10^{-2}$ |
| $n_5$ | 1.48749 | 1.48749 | 1.48749 | 1.48749 |
| $n_6$ | 1.84666 | 1.84666 | 1.84666 | 1.84666 |
| $n_4$ | 1.77250 | 1.77250 | 1.77250 | 1.77250 |

In the above table, it is noted that $|x_3|$ in Condition (13) represents the amount of displacement of the aspherical surface of the third lens unit proximate to the object side at the height at which the marginal rays run when the stop is open, at the wide angle end and when the object point lies at infinity, and $|x_4|$ in Condition (14) indicates the amount of displacement of the fourth lens until at the maximum image height x (4/3).

As explained above, the present invention provides a zoom lens system which comprises a zoom subsystem consisting of a first lens unit having a positive refracting power and a second lens unit having a negative refracting power and an image formation subsystem consisting of a third lens unit having a positive refracting power and constantly remaining fixed and a fourth lens unit having a positive refracting power and movable for zooming and focal position regulation and which has a very short total length and is well corrected for aberrations and so is best suited for use with handy camcorders by introducing aspherical configuration into a part of said image formation subsystem, determining the paraxial arrangement of each lens unit properly and adopting some suitable means for lens configurations.

The zoom lens system according to this invention comprises as small as nine constituent lenses, an F-number of 1.8 at the wide angle end and a zoom ratio as high as about 8. For all that, this high-performance zoom lens system has a very short total length, say, $9f_W$ (at a field angle of 50°) to $9.8 f_W$ (at a field angle of 54°), when an optical type low-pass filter is inserted through it, and can obtain a sharp response even at 400 TV scanning lines and when the stop is open.

What is claimed is:

1. A zoom lens system which includes, in order from the object side, a first lens unit having a positive refracting power, a second lens unit having a negative refracting power, including a doublet, and movable along the optical axis for zooming, a third lens unit comprising, in order from the object side, a positive leans in which the object-side surface has a stronger curvature than the image-side surface and takes an aspherical configuration and a negative meniscus lens in which the image-side surface has a stronger curvature than the object-side surface, said third lens unit having a positive refracting power as a whole, and a fourth lens unit consisting of a positive single lens in which the object-side surface takes an aspherical configuration and movable along the optical axis for zooming and focusing, wherein said third and fourth lens units satisfy the following conditions:

$$0.4 < f_{34S}/(f_W f_T)^{\frac{1}{2}} < 0.8, \tag{1}$$

$$0.28 < \beta_{4T} < 0.56, \tag{2}$$

$$0.4 < r_{31}/\{(n_{31} - 1)(f_W f_T)^{\frac{1}{2}}\} < 0.8, \tag{3}$$

$$0.25 < r_{34}/\{(n_{34} - 1)(f_W f_T)^{\frac{1}{2}}\} < 0.6, \tag{4}$$

$$0.2 < D_{III}/(f_W f_T)^{\frac{1}{2}} < 0.4, \tag{5}$$

$$0.3 < D_{34T}/(f_W f_T)^{\frac{1}{2}} < 0.6, \text{ and} \tag{6}$$

$$1.45 < n_5 < n_6 - 0.25, \tag{18}$$

where:
$f_W$ and $f_T$ are the focal lengths of the total system at the wide angle and telephoto ends, respectively,
$f_{34S}$ is the composite focal length of the third and fourth lens units when the focal length of the total system lies at $(f_W f_T)^{\frac{1}{2}}$ and the object point at infinity is focused, $\beta_{4T}$ is the magnification of the fourth lens unit when the object point at infinity is focused at the telephoto end,
$r_{31}$ and $r_{34}$ are the radii of curvature of the surfaces of the third lens unit proximate to the object and image sides, respectively,
$n_{31}$ and $n_{34}$ are the refractive indices of the positive and negative meniscus lenses of the third lens unit, respectively,
$D_{III}$ is the distance on the optical axis between the surfaces of the third lens unit proximate to the object and image sides, respectively,
$D_{34T}$ is the space on the optical axis between the third and fourth lens units, when the object point at infinity is focused at the telephoto end, and
$n_5$ and $n_6$ are the refractive indices of the respective lenses of the doublet of the second lens unit.

2. A zoom lens system as claimed in claim 1, wherein said first and second lens units satisfy the following conditions (7)–(10):

$$0.25 < |f_{II}|/(f_W f_T)^{\frac{1}{2}} < 0.5, \tag{7}$$

$$0.25 < |\beta_{IIS}|f_W/(f_W f_T)^{\frac{1}{2}} < 0.5, \tag{8}$$

$$0.3 < D_I/(f_W f_T)^{\frac{1}{2}} < 0.6, \tag{9}$$

and $$0.25 < D_{II}/(f_W f_T)^{\frac{1}{2}} < 0.5, \tag{10}$$

where:
$f_{II}$ is the focal length of the second lens unit,
$\beta_{IIS}$ is the magnification of the second lens unit when he focal length of the total system lies at $(f_W f_T)^{\frac{1}{2}}$ and the object point at infinity is focused,
$D_I$ is the distance on the optical side between the surfaces of the first lens unit proximate to the object and image sides, respectively, and
$D_{II}$ is the distance on the optical axis between the surfaces of the second lens unit proximate to the object and image sides, respectively.

3. A zoom lens system as claimed in claim 2, wherein the following conditions (11)–(14) are satisfied:

$$-1.3 < SF_{31} < -0.5, \tag{11}$$

$$-1.2 < SF_{41} < -0.4, \tag{12}$$

$$0.06 < |\Delta x_3| F_{NO}^3/(f_W f_T)^{\frac{1}{2}} < 0.22, \tag{13}$$

and $$0.006 < |\Delta x_4| F_{NO}^2/(f_W f_T)^{\frac{1}{2}} < 0.025, \tag{14}$$

where:
$SF_{31}$ and $SF_{41}$ are the shape factors of the positive lens of the third lens unit and the positive lens of the fourth lens unit, respectively,
$\Delta x_3$ and $\Delta x_4$ are the amounts of displacement of the aspherical surfaces of the third and fourth lens units from the reference spherical surface, respectively, and
$F_{NO}$ is the F-number of the total system at the wide angle end.

4. A zoom lens system as claimed in claim 3, wherein the following condition (15) is satisfied:

$$0.07 < D_{IV}/(f_W f_T)^{\frac{1}{2}} < 0.2, \tag{15}$$

where $D_{IV}$ is the thickness of the positive lens of the fourth lens unit.

5. A zoom lens system as claimed in claim 4, wherein the first lens unit includes, in order from the object side, a negative meniscus lens convex on the object side and two positive lenses; the second lens unit includes, in order from the object side, a negative lens strongly concave on the image side and said doublet, said doublet consisting of a cemented positive lens obtained by cementing a bi-concave lens to a positive lens strongly convex on the object side; and wherein the following conditions (16)–(19) are satisfied:

$$0.7 < f_{13}/f_{12} < 1.6, \quad (16)$$

$$-0.01 < (f_Wf_T)/(r_3r_5) < 0.01, \quad (17)$$

and $$1.65 < n_4, \quad (19)$$

where:
- $f_{12}$ is the focal length of the positive lens of the first lens unit on the object side,
- $f_{13}$ is the focal length o the positive lens of the first lens unit on the image side,
- $r_3$ and $r_5$ are the radii of curvature of the image-side surfaces of said two positive lenses,
- $n_4$ is the refractive index of the negative lens located on the object side in the second lens unit.

6. A zoom lens system which includes, in order from the object side, a first lens unit having a positive refracting power, a second lens unit having a negative refracting power, including a doublet, and movable along the optical axis for zooming, a third lens unit including a negative lens and having a positive refracting power, and a fourth lens unit having a positive refracting power and movable along the optical axis for zooming and focusing, and consists of nine or less lenses in all, and wherein said second lens unit meets the following condition:

$$1.45 < n_5 < n_6 - 0.25$$

where $n_5$ and $n_6$ are the refractive indices of the respective lenses of the doublet of the second lens unit.

7. A zoom lens system as claimed in claim 6, wherein the luminous flux leaving the third lens unit is in a substantially afocal or convergent state.

8. A zoom lens system as claimed in claim 7, in which said fourth lens unit consists of a single positive lens.

9. A zoom lens system as claimed in claim 6, in which said third lens unit further includes a positive lens having an aspherical surface.

10. A zoom lens system as claimed in claim 6, in which said fourth lens unit consists of a single positive lens.

11. A zoom lens system as claimed in claim 6, in which said third lens units consists of a positive lens having an aspherical surface and a negative lens.

12. A zoom lens system which includes, in order from the object side, a first lens unit having a positive refracting power, a second lens unit having an negative refracting power, including a doublet, and movable along the optical axis for zooming, a third lens unit having a positive refracting power, and a fourth lens unit having a positive refracting power and movable along the optical axis for zooming and focusing, and wherein a luminous flux leaving said third lens unit is in a substantially a focal or convergent state, said third lens unit includes a positive lens having a surface with the curvature stronger on the object side than on the image side and a negative lens having a surface with the curvature stronger on the image side than on the object side, the surface of said positive lens located on the object side is an aspherical surface with the curvature decreasing monotonously as it is spaced away from the optical axis, and the total system consists of none or less lenses in all, and said second lens unit meets the following condition:

$$1.45 < n_5 < n_6 - 0.25$$

where $n_5$ and $n_6$ are the refractive indices of the respective lenses of the doublet of the second lens unit.

13. A zoom lens system as claimed in claim 12, wherein the forth lens unit consists of a positive single lens, in which the object-side surface takes an aspherical configuration whose curvature decreases monotonously as it is spaced away from the optical axis.

* * * * *